United States Patent
Battaglia

(10) Patent No.: US 11,030,085 B2
(45) Date of Patent: Jun. 8, 2021

(54) USER DEFINED MOCKING SERVICE BEHAVIOR

(71) Applicant: salesforce.com, inc., San Francisco, CA (US)

(72) Inventor: Martin Battaglia, Pilar (AR)

(73) Assignee: salesforce.com, inc., San Francisco, CA (US)

( * ) Notice: Subject to any disclaimer, the term of this patent is extended or adjusted under 35 U.S.C. 154(b) by 181 days.

(21) Appl. No.: 16/252,256

(22) Filed: Jan. 18, 2019

(65) Prior Publication Data

US 2020/0233789 A1 Jul. 23, 2020

(51) Int. Cl.
*G06F 11/00* (2006.01)
*G06F 11/36* (2006.01)
*G06F 9/54* (2006.01)
*H04L 29/08* (2006.01)

(52) U.S. Cl.
CPC .......... *G06F 11/3688* (2013.01); *G06F 9/547* (2013.01); *H04L 67/02* (2013.01); *H04L 67/10* (2013.01)

(58) Field of Classification Search
CPC ............. G06F 11/3688; G06F 11/3616; G06F 11/263; G06F 11/3664
See application file for complete search history.

(56) References Cited

U.S. PATENT DOCUMENTS

| | | | | |
|---|---|---|---|---|
| 10,089,219 | B1* | 10/2018 | Bates | G06F 9/451 |
| 10,437,712 | B1* | 10/2019 | Tyler | G06F 11/3684 |
| 2018/0357154 | A1* | 12/2018 | Dolby | G06F 11/3684 |
| 2019/0130719 | A1* | 5/2019 | D'Amico | G06F 9/44 |
| 2020/0233787 | A1* | 7/2020 | Battaglia | G06F 9/547 |

OTHER PUBLICATIONS

Google Scholar/Patents—text refined (Year: 2021).*

* cited by examiner

*Primary Examiner* — Christopher S McCarthy
(74) *Attorney, Agent, or Firm* — Holland & Hart LLP

(57) ABSTRACT

A mocking service allows a mocking instance of an API specification to receive behavior parameters with requests for resources of the API specification. The mocking service may digest these parameters and generate a response according to the parameters and using the instance of the API specification. The dynamic responses allow a service to be configured for interacting with an API corresponding to the API specification and for interacting with different response scenarios of the API. The parameters may define response behaviors such as a fixed time until a response is received, a variable time until a response is received, error rate, error codes, validations, etc. In some cases, based on a behavior parameter indicating a request for random data for a requested resource, the mock implementation of the API may generate and return random data according to variables defined in the API specification.

17 Claims, 12 Drawing Sheets

USER DEFINED MOCKING SERVICE BEHAVIOR

FIELD OF TECHNOLOGY

The present disclosure relates generally to database systems and data processing, and more specifically to user defined mocking service behavior.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may be used by developers to test application program interface (API) specifications and to configure services for interacting with APIs according to the API specification. Mocking services can be used to generate and test "prototypes" of APIs. For example, these prototypes may simulate how full implementations of APIs respond to different API requests. When a mocking service simulates a full implementation of an API, simulation behavior may be limited to the behaviors encoded in the API specification, which may not entirely correspond to the behavior of a full implementation of the API.

DETAILED DESCRIPTION

Figure 1:
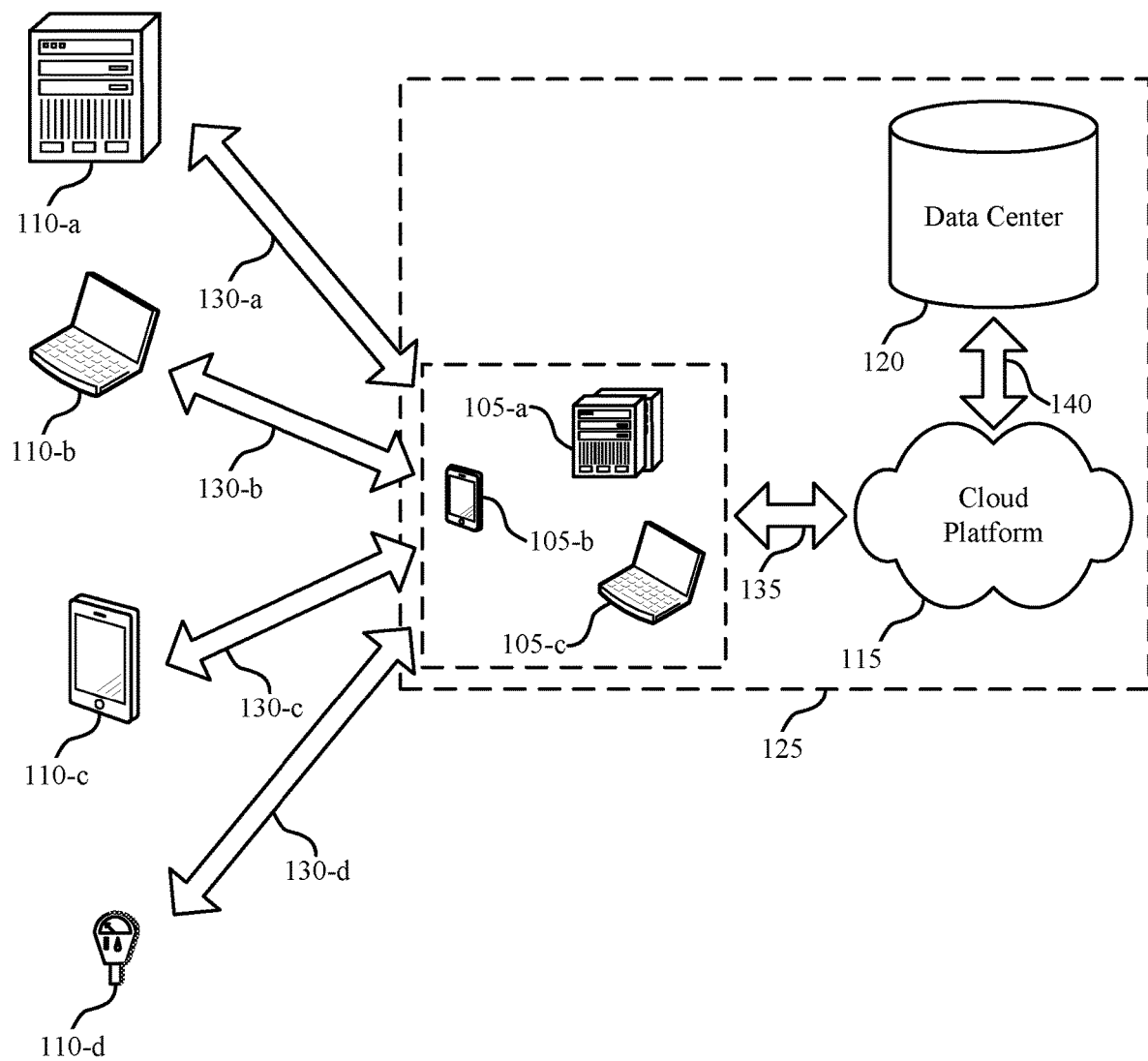
FIG. 1 illustrates an example of a system for testing an application programming interface (API) that supports user defined mocking service behavior in accordance with aspects of the present disclosure.

A mocking service provides functionality for a mock implementation of an API specification to receive behavior parameters with requests for resources of the API specification. The mocking service may digest these parameters and generate a response according to the parameters and using the implementation of the API specification. The dynamic responses allow a service to be configured for interacting with an API corresponding to the API specification and for interacting with different response scenarios of the API. The parameters may define response behaviors such as a fixed time until a response is received, a variable time until a response is received, error rate, error codes, validations, etc.

A mocking server parses an API specification to generate a parsed model of the API specification and generates a mock implementation of the API specification based on the parsed model. A user may transmit requests (e.g., hypertext transfer protocol (HTTP) requests) to the mock implementation, and the requests may include response behavior parameters. The behavior parameters may be implemented as custom HTTP headers and may be used by the user to test different response scenarios, such as delayed responses, status codes, random data, etc. Accordingly, the user may configure a service for interacting with the API, which is being or will be designed based on the API specification. Thus, the functionality of the API may be simulated using the API specification and certain expected or potential API behaviors may be tested without a full implementation of the API.

In some cases, the mock implementation may generate random data for resources defined in the API specification. For example, the API specification may define a product as an example resource. The product may include various data fields that are defined by variable types. Example product data fields may include a description (string), a price (float rounded to two decimals), rating (integer), etc. In some cases, the API specification does not define example values for the data fields for the resource. As such, a request for the resource may return empty data. The implementations described herein provide functionality such that the server may generate random data based on the data types (as well as other constraints) and return the random data as a response to a resource request. The server may generate the random data based on a random data behavior parameter being included in the resource request.

Other behavior parameters that may be included in a request to the mock implementation may include a time delay parameter, an error rate parameter, status code parameter, validation parameter, etc. The time delay parameter may define a fixed or random delay for transmitting a response to the request. Accordingly, a user may simulate requests that may require significant resources, such as processing, before a response is generated by the API (e.g., the mock implementation). The other response behavior parameters are similarly used for testing and simulation purposes.

Aspects of the disclosure are initially described in the context of an environment supporting an on-demand database service. Aspects of the disclosure are further described with respect to mocking service details and a process flow diagram. Aspects of the disclosure are further illustrated by and described with reference to apparatus diagrams, system diagrams, and flowcharts that relate to user defined mocking service behavior.

FIG. 1 illustrates an example of a system 100 for cloud computing that supports user defined mocking service behavior in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may include a server, such as a mocking server, which hosts an API mocking service. In some cases, the server may include aspects of an application server as described herein. The mocking service may support secure, efficient API testing and validating. The mocking service may expose an endpoint of the API to a user, which may be an example of a cloud client 105 or a contact 110. The user may be an example of a tenant of the mocking server. The user may use the endpoint to test the API prior to full implementation (e.g., publishing) of the API. The testing may be based on an API specification and its underlying metadata. An API specification may refer to a document or program that defines at least a portion of the functionality of an API (e.g., including any combination of behaviors, definitions, documentation, etc., for the API). The user may validate whether the API is functioning properly and troubleshoot any problems with the API based on results of the mocking service.

In other conventional systems, a server hosting a mocking service may receive mock requests and generate mock responses based on an API specification generated by a developer. A user testing the API specification may receive only static responses, which are generated based on the API specification. Current mocking services may generate the static responses to requests sent to a mocking instance of the API specification, and the API specification may behave statically. This static behavior may be due to API specifications not being fully developed versions of the API, mocking services not being configured to respond to requests in a dynamic manner based on the API specification as would be expected in a full implementation of an API that corresponds to an API specification, and the mocking service being configured to return only the resources as defined in the API specification. Supporting only static behavior based only on an API specification (e.g., a not fully developed API) may limit the accessibility of the mocking service to users who are building tools or services that may interact with the fully developed API.

To enhance functionality and accessibility of the mocking service in the system 100, the mocking server may receive requests directed to the mock implementation where the requests may include behavior parameters that may define how the mock implementation is executed and replies are generated and transmitted in response to the request. The mocking service may digest these parameters and generate a response according to the parameters and using the implementation of the API specification. The dynamic responses allow a service to be configured for interacting with a simulated full implementation of the API corresponding to the API specification and for interacting with different response scenarios of the API. The parameters may define response behaviors such as a fixed time until a response is received, a variable time until a response is received, error rate, error codes, validations, random data, etc.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example, a developer may design an API specification for an API using the system 100. The API may not yet be released, so the developer may be testing the API to check its functionality and verify whether the API is ready for publishing. The developer may use the mocking service described herein to generate a mock implementation of the API. The developer may use a user device (e.g., as a cloud client 105) to interact with the mocking service via a user interface of the user device, and the developer may further share an endpoint for interacting with the API to other developers for testing and designing tools or services that may interact with the API. Because the API is not fully developed, the developers may encode behavior parameters in requests to the mock implementation of the API specification, such that different response scenarios may be considered. For example, a developer may encode a lengthy response delay in a request such as to design a user interface or visual indicator that specifies that a response is expected. The developers may also encode parameters for testing different error or status codes and for testing different resource data.

Figure 2:
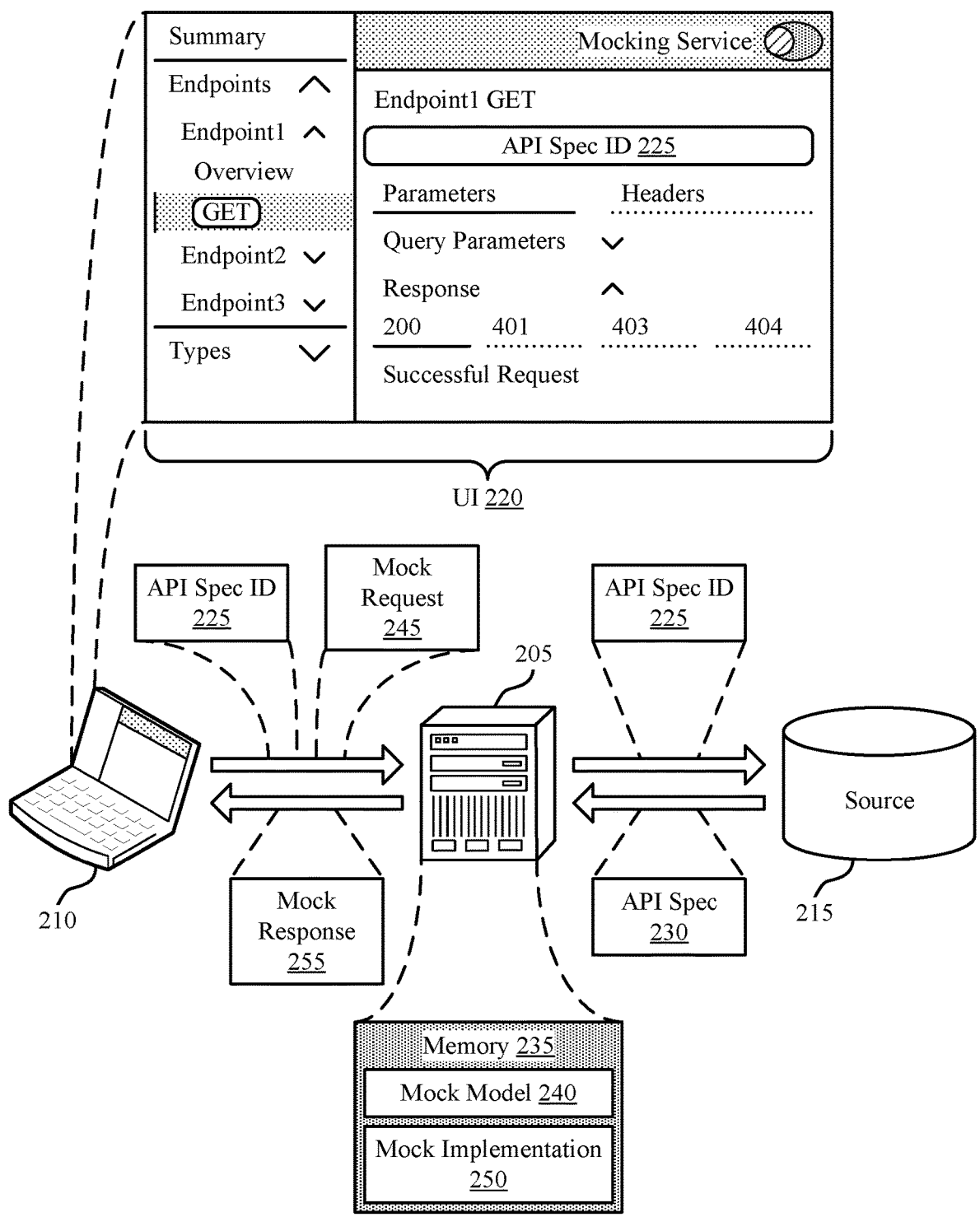
FIG. 2 illustrates an example of a mocking service that supports user defined mocking service behavior in accordance with aspects of the present disclosure.

FIG. 2 illustrates an example of a mocking service 200 that supports user defined mocking service behavior in accordance with aspects of the present disclosure. The mocking service 200 may include a server 205, which may be an example of a mocking server or application server. This server 205 may be a single server, a server cluster, a container, a virtual machine, or any other device or system for running mock implementations 250 of API specifications 230. The server 205 may receive information from a user device 205 (e.g., via a user interface 220) to generate mock models 240 and execute mock implementations 250. Additionally, in some cases, the server 205 may retrieve API specifications 230 from one or more sources 215. A source 215 may be an example of an internal repository to the server 205 or a system served by the server 205, an external repository to the server 205, a shared code repository, a file upload, a database, a data store, a cloud-based storage entity, or some combination of these or other storage systems. In some cases, the server 205 or user device 210 may operate as the source 215 for an API specification 230.

The mocking service 200 may support secure, efficient API testing and validation. The mocking service user interface 220 may allow a user operating the user device 210 to simulate requests to an API in order to test that the API is functioning properly, troubleshoot problems, and/or to demo the API. For example, the mocking service 200 may expose an endpoint to a user—via the user interface 220—that the user may use for testing an API prior to full implementation (e.g., publishing) of the API. This testing may be based on an API specification 230 and its underlying metadata. An API specification 230, as described herein, may refer to any document or program that defines at least a portion of the functionality of an API (e.g., including any combination of behaviors, definitions, documentation, etc. for the API). The user may validate whether the API is functioning properly based on results of the mocking service 200.

In some cases, the mocking service 200 may be an extension of an API designer application (e.g., an API designer web tool). The API designer application may support a user creating new API specifications 230 and/or editing existing API specifications 230. For example, a user may design an API at the user device 210 in a web tool with a built-in parser. This parser may be specific to an API modeling language (e.g., representational state transfer (REST)ful API modeling language (RAML)) and may parse the user-defined API specification 230 to generate a mock model 240 for the API. The user device 210 may send this pre-parsed mock model 240 to the server 205, and the server 205 may store the mock model 240 in memory 235. To test the API specification 230, the user may input requests to the API in the mocking service user interface 220. If the mocking service 200 is turned on (e.g., a mocking service switch is toggled to indicate that the mocking service 200 is 'ON'), the server 205 may receive the mock request 245 and simulate the request using the pre-parsed mock model 240 in memory. This simulation may be referred to as a mock implementation 250 or mock instance. The server 205 may determine a mock response 255 based on the mock implementation and may return the mock response 255 to the user device 210. This response may be displayed in the user interface 220. For example, the mock response 255 may include one or more HTTP status codes (e.g., "200," "401," "403," and "404" as illustrated in FIG. 2), one or more error messages, one or more requested resources of the mock implementation 250, or some combination of these responses. In this way, the mocking service 200 may simulate a real implementation of an API but may return a simulated (i.e., "mock") result.

In these cases where the mocking service 200 is built into an API designer tool, a user may validate an API specification 230 created or modified in the API designer tool using feedback from the mocking service 200. Based on the mock response 255 received from the server 205, the user may iterate on the design of the API specification 230, simulate the updated API, receive further feedback, validate whether the API operates as desired, and design a service for interacting with the API based on the API specification 230. A user may loop through this procedure as many times as necessary within the API designer application prior to publishing the API to test the API specification 230 for errors or bugs. Once satisfied, the user may publish the API for reuse by a wider set of users (e.g., any users, users with specific licenses or authentication tokens, users with certain security credentials, etc.).

In other cases, the mocking service 200 may operate as a standalone service (e.g., independent of an API designer tool, as illustrated in FIG. 2). In these cases, the mocking service 200 may allow a user to input an API specification identifier 225 into a user interface 220. This API specification identifier 225 may indicate an API specification 230 for the server 205 to retrieve from a source 215. Additionally, the API specification identifier 225 may specify how to retrieve the API specification (e.g., the user may provide the source 215 and any authentication needed to access information from the source 215). The format for the API specification identifier 225 may depend on the source 215 of the API specification 230. For example, different sources 215 may use different project identifiers, organization identifiers, version values, or some combination of these or other identification parameters to identify the indicated API (and the corresponding API specification 230). Particular API specification identifier 225 formats for different sources 215 may be documented (e.g., in a public portal) for user access. Based on the API specification identifier 225 received from the user device 210, the server 205 may retrieve the indicated API specification 230 from the corresponding source 215. Alternatively, the user may upload the API specification 230 directly to the server 205. In such an example, the user device 210 may be regarded as the source 215 of the API specification 230, and the API specification identifier 225 may be an explicit or implicit indication that the information provided to the mocking service 200 from the user includes the API specification 230 for simulation.

The server 205 may then parse the retrieved API specification 230 on-the-fly in memory 235. In some cases, the server 205 may contain a universal parser to handle API specifications 230 written using multiple different API design languages. For example, the universal parser may be an example of an API modeling framework (AMF) parser internal to the server 205. The server 205 may parse the API specification 230 to generate a mock model 240 for the API and may persist the mock model 240 in memory 235. This specification parsing process may be transparent to the user providing the API specification identifier 225.

The user may simulate mock requests 245 to this mock model 240 via the user interface 220. An API request may be formatted as a link to a particular uniform resource locator (URL) and may include an endpoint, a method, one or more headers, and a set of data (i.e., the body of the request). For example, as illustrated in FIG. 2, the user may select "Endpoint1" as the endpoint for the mock request 245 in the user interface 220 and may test a "GET" method. Other methods supported by the mocking service 200 may include "PUT," "POST," "PATCH," "DELETE," or some combination of these or other API methods. A mock request 245 may include all or a subset of the parameters of a regular API request. For example, in some cases, a mock request 245 may not include data, and instead the API specification 230 may define values to use as mock data when performing testing on the API. To handle a mock request 245 sent by the user device 210, the server 205 may generate a mock implementation 250 of the API based on the mock request 245. This mock implementation 250 (i.e., a mock instance) may simulate the API handling and responding to such an API request, and may be temporarily cached in memory 235 at the server 205. To securely test the API, the server 205 may run the mock implementation 250 of the API internal to the server 205 without any database access. This may prevent the server 205 from altering any data at a database when the mocking service 200 is activated. Furthermore, running the mock implementation 250 internal to the server 205 may reduce the processing time for the mock instance (e.g., as compared to mocking procedures that use external connections to retrieve information during the mocking procedures).

Running the mock implementation 250 based on the mock request 245 may result in a mock response 255. This mock response 255 may simulate an API response to an API request containing the same or similar parameters as the mock request 245. As such, this mock response 255 may be based on information in the API specification 230 (e.g., methods, data types, parameters, metadata, etc.). The server 205 may transmit the mock response 255 to the user device 210 in response to the mock request 245. The user device 205 may display the mock response 255 in the user interface 220. For example, as illustrated, the user interface 220 may display a mock response 255 with an HTTP status code of "200," indicating that the mock model 240 successfully handled the mock request 245. Other mock responses 255 may indicate problems with handling a mock request 245 using HTTP status codes, error messages, resource data, or a combination of these. These mock responses 255 may additionally indicate where the problem may have occurred (e.g., a status code in the 400s may indicate an error originating from the client, such as user device 210, while a status code in the 500s may indicate an error originating from the server 205). Based on the mock response 255 displayed in the user interface 220, the user may determine how to modify an API, an API specification 230, an API request, or a service interacting with the API. By handling API specification 230 parsing and mock implementations 250 internally at the server 205, the mocking service 200 may support robust API simulations across multiple API design languages and sources 215.

In some cases, a mock request 245 may include one or more response behavior parameters. These parameters may be included in custom headers in the mock request 245 and may be configured via the UI 220. In some cases, the custom headers may be configured by a user at another device using an instance of the UI 220 or using custom API requests. For example, a user may be configuring a service for interacting with an API based on the API specification 230 and may utilize custom mock requests 245 for designing the service. The response behavior parameters may be used to define how the mock implementation 250 responds to requests, such that a user may configure the service for interacting with the API according to different response scenarios.

The mock implementation 250 may simulate the API according to the response behavior parameters received in the mock request 245 and respond accordingly. The mocking service 200, when generating the mock implementation, 250 may include instructions for responding to requests with behavior parameters. Accordingly, the parameters may be used to define real use case scenarios for a service interacting with the API. Behavior parameters may define response delay time periods, error rates, error levels, status codes, validations, random data generation, etc. For example, a user interacting with the mock implementation 250 may define a fixed time delay for receiving the mock response 255. The fixed time delay may be used to simulate a response to a request that may incur significant processing resources at the server 205. Accordingly, a user may configure a service (e.g., a UI) for interacting with the API and may configure a UI behavior when a response requires some extended period of time.

In some cases, the API specification 230 may define various resources that may be requested at an endpoint via a mock request 245. A resource may include various data fields that may be defined by variable types (e.g., integers, strings, floats, objects). In some case, the API specification 230 may include example data for each of the fields, but in some cases, the API specification 230 may not include example data. In either case, a mock request 245, which includes a request for a particular resource, may include a behavior parameter which indicates a request for randomly generated data for the resource. The mock implementation 250 may run and simulate a response including the requested resource with randomly generated data for the resource. Thus, a requested resource including an integer type field may include a randomly generated integer for the field. Similarly, if the resource includes a string type filed, then the response 255 may include a randomly generate string for the requested resource.

Figure 3:
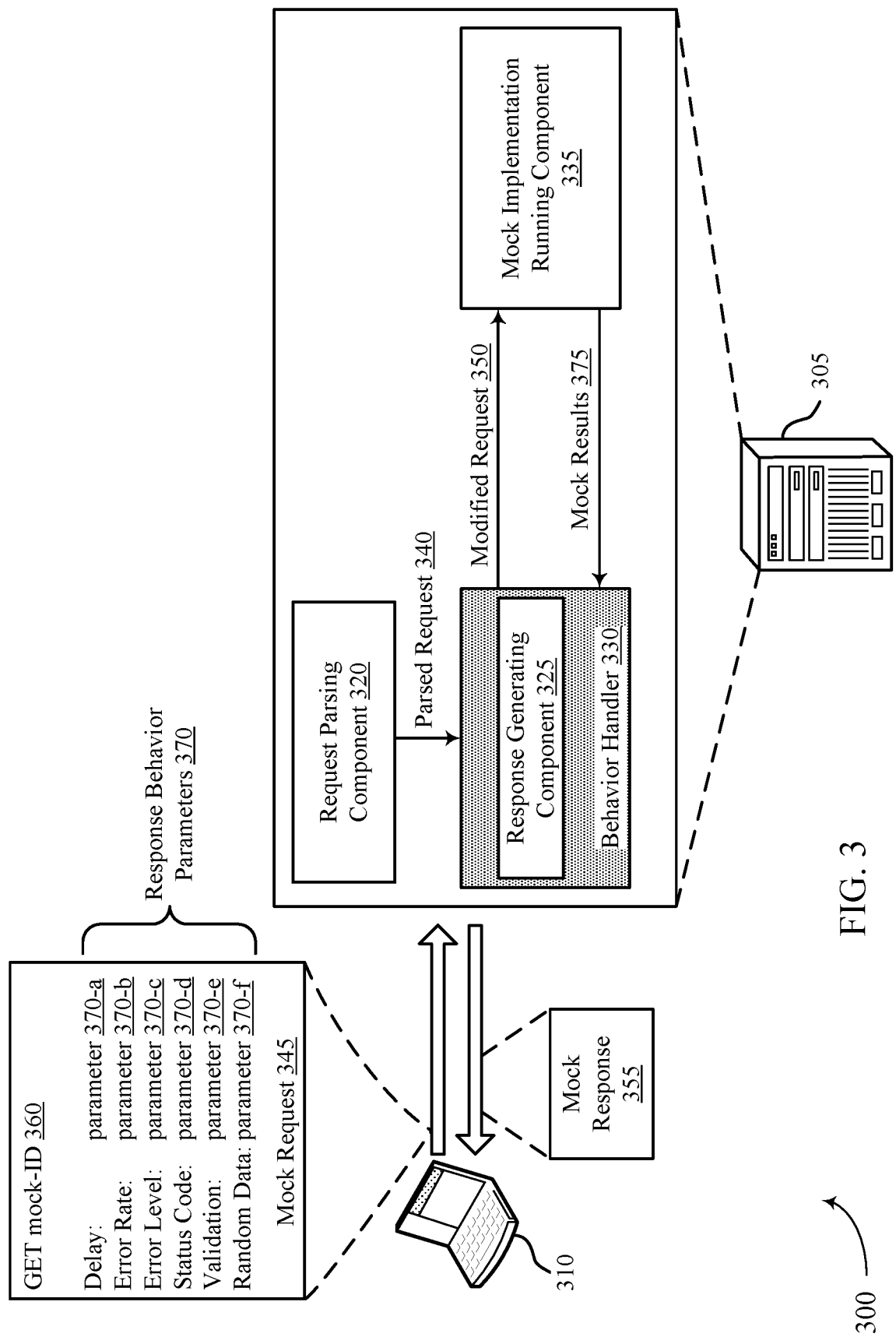
FIG. 3 illustrates an example of a mocking service that supports user defined mocking service behavior in accordance with aspects of the present disclosure.

FIG. 3 illustrates an example of a mocking service 300 that supports user defined mocking service behavior in accordance with various aspects of the present disclosure. The mocking service 300 may include a server 305, which may be an example of a server 205 of FIG. 2. The server 305 may receive requests 345 from a user device 305 to generate and transmit mock responses 355 to the user device 305. The server 305 may include memory which stores and executes the mock implementation based on a parsed model of an API specification, as described with respect to FIG. 2.

The user device 310, which may be an example of the device 205 of FIG. 2, may be the device that provided the API specification or the indication of the API specification or may be another device with authenticated access to the mock implementation. A user may be configuring a tool or service for interacting with an API using the device 310. A service may include a user interface, backend service, etc. that may transmit requests to and receive responses from an API that is being designed or prototyped via the API specification. Accordingly, the API specification may define requestable resources and some functionality that may be included in the API. In some cases, the API specification may define example data for requestable resources, and in other cases, the API specification my not define the example data but may include parameter types and configurations for resources.

When generating the mock implementation, the server 305 may configure the functionality for the mock implementation 350 to generate a mock response 355 according to response behavior parameters 370 included in a mock request 345. The server 305 may include a behavior handler 330 for handling behavior parameters 370 received in a mock request 345. A user using the user device 310 may configure the response behavior parameters 370 using a UI (e.g., the UI 220 of FIG. 2) or may configure the response behavior parameters 370 on a customized basis. For example, the mocking service 300 may provide a UI for the user device 310 where a user may toggle or select parameters for sending a mock request 345. The UI may configure the mock request 345 according to the toggles or selected parameters.

The mock request 345, which may be an example of an HTTP request, includes a "GET" method and includes an identifier 360 for the mock implementation. The response behavior parameters may be examples of custom HTTP headers, in which the behavior handler 330 is configured to process as part of the mocking services 300. The mock behavior parameters 370 may define a time period for a delayed mock response 355 (e.g., via parameter 370-$a$), an error rate (e.g., via parameter 370-$b$), an error level (e.g., via parameter 370-$c$), a status code (e.g., via parameter 370-$d$), a validation (e.g., via parameter 370-$e$), a random data parameter 370-$f$, etc. The delay parameter 370-$a$ may define a time period for a delayed mock response 355. In some cases, the delay may be a fixed delay. For example, a user at device 310 may be configuring a service for requesting resources from the API and the requested resource is expected to be a time and resource intensive operation at the server hosting the API. Accordingly, the user may configure a fixed time delay for the response 355 for configuring the service for interacting with the delayed response. As such, the user may configure a waiting indicator or UI component for notifying a user that the service is awaiting the response. In some cases, the delay parameter 370-$a$ may indicate a variable delay before sending the mock response 355. Accordingly, the user may configure the service for interacting with the API for various delayed response scenarios. The parameter may define a range for delayed response, a maximum or minimum delay, etc.

The error rate parameter 370-$b$ may define a probability of returning an error in the mock response 355. This allows the user at the device 310 to configure a service for interacting with various error scenarios and with various error rates. In a service that may transmit requests to an API with a high frequency, the error rate may be useful in configuring the service to handle various frequent errors. The error level parameter 370-$c$ may define which statuses may be considered an error. A status code parameter 370-$d$ may be used such that the mock response 355 includes a fixed status, random status, or status within a specific set. Thus, the error rate parameter 370-$b$, the error level parameter 370-$c$, and the status code parameters 370-$d$ may be used, alone or in combination, for configuring a service to interact with or respond to different error/status codes.

The validation parameter 370-$e$ may be used to define how the API specification reacts or responds to different request types. For example, the validation parameter 370-$e$ may be used to indicate to the mock implementation that it should validate various portions of the request (e.g., to ensure the request include the required features or fields) and respond to invalid requests. The validation parameter 370-$e$ may also define whether the mock implementation 350 validates response payloads and to what extent. Accordingly, a user may utilize the validation parameter 370-$e$ to configure a service for various request types and for invalid requests and response payloads.

The random data parameter 370-$f$ may trigger generation of random data for the mock response 355. For example, if the mock request 345 indicates a resource and the random data parameter 370-$f$ is included, the mock implementation 350 may generate random data according to parameters defining the requested resources. For example, if the resource includes a string data type and an integer data type, then the mock response 355 may include a randomly generated string and a randomly generated integer. As a specific example, the API specification may define a product as a resource type. The product resource may include various subfields such as a description (string) and a price (float rounded to two decimals). If a product is requested in the mock request 345 and the request includes the parameter 370-$f$, then the mock implementation 350 may generate random data for the description and price according to the type defined subfields and include the data in the mock response 355. Thus, a user of the device 310 may configure a service for interacting with and displaying various random data (e.g., different string lengths), for sorting the data, etc.

The mock request 345 is received at the server 305, and a request parsing component 320 parses the request 345, identifies the response behavior parameters 370, as well as other substantive portions of the request 345, and transmits a parsed request 340 to the behavior handler 330. The behavior handler 330 may identify certain behaviors required for running the mock implementation. Such behaviors may include error rates, status codes, error levels, validations, random data, etc. The behavior handler 330 may transmit a modified request to a mock implementation running component 335, which runs the mock implementation according to the request 345 and returns mock results 375 to the behavior handler 330. The mock results 375 may include the error or status codes, resources, resource parameters, etc. A response generating component 325 generates a response according to the mock results 375. The mock response 355 is returned to the user device 310. In some cases, the behavior handler 330 may delay returning the mock response 355 according to the delay parameter 370-a received in the mock request 345.

Figure 4:
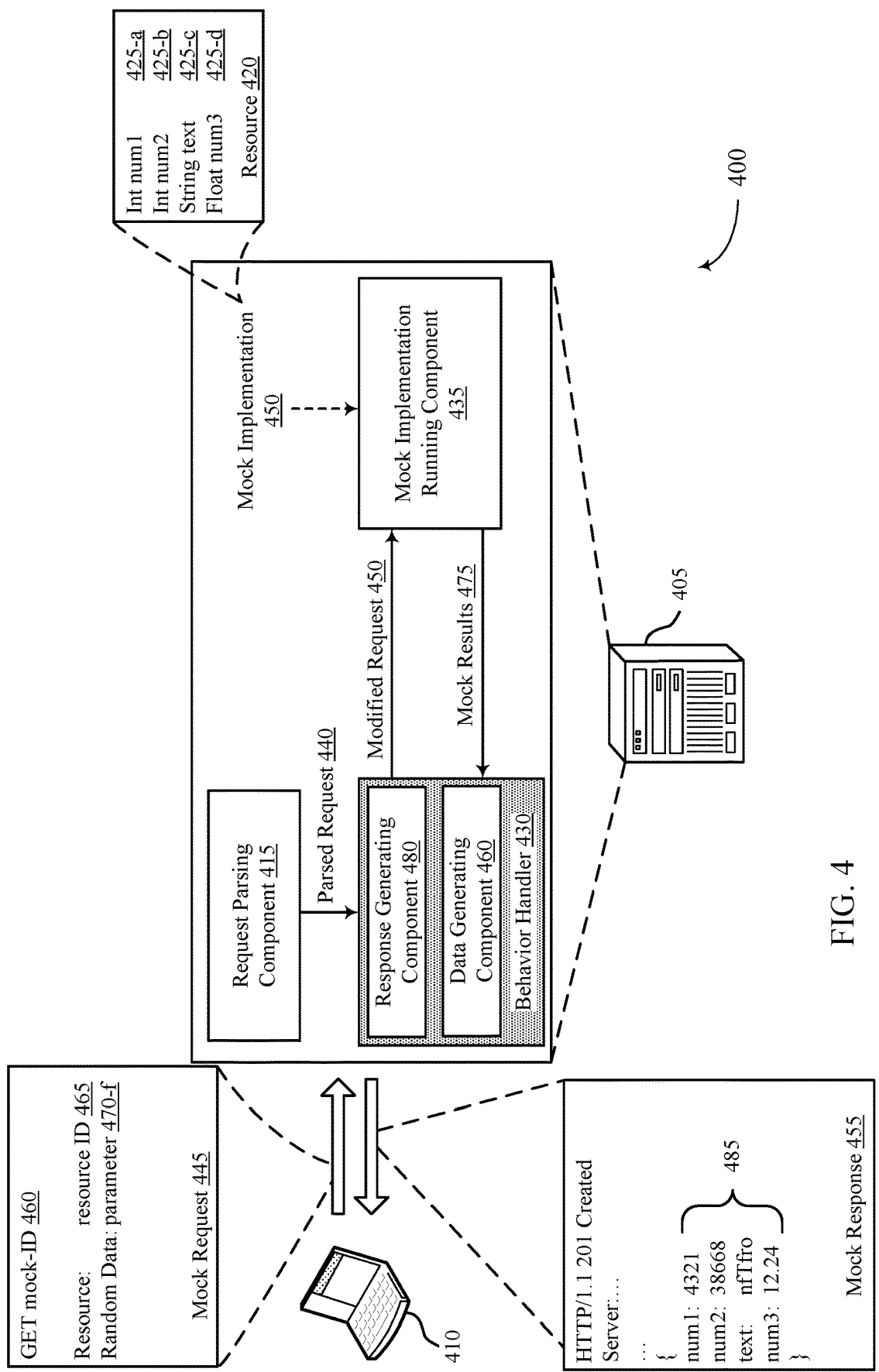
FIG. 4 illustrates an example of a mocking service that supports user defined mocking service behavior in accordance with aspects of the present disclosure.

FIG. 4 illustrates an example of a mocking service 400 that supports user defined mocking service behavior in accordance with aspects of the present disclosure. The mocking service 400 may include a server 405, which may be an example of a server 305 of FIG. 3. The server 405 may receive requests 445 from a user device 410 to generate and transmit mock responses 455 to the user device 410. The server 405 may include memory, which stores and executes a mock implementation 450 (e.g., via mock implementation running component 435) based on a parsed model of an API specification, as described with respect to FIG. 2. The API specification, and thus the mock implementation 450, may include a resource 420 including a set of data fields defined by data types. As an example illustrated in FIG. 4, the resource 420 includes integers 425-a and 425-b (titled "num1" and "num2"), a string 425-c ("text"), and a float 425-d ("num3"). In some cases, the API specification includes one or more example values for the fields, but in other cases, the API specification does not include example values for the data fields.

When the mocking service 400 generates the parsed model of the API specification, the mocking service 400 may identify the data fields 425 defined in resources, such as the resource 420. Thus, if the resource 420 is requested by a device (e.g., user device 410), then the mock implementation 450 may return example data included in the API specification, or the server 405 may generate random data based on a mock request 445 including a random data parameter 470-f and based on the fields 425 defined in the requested resource 420.

In FIG. 4, the mock request 445 includes a request for a resource via a resource identifier 465 (e.g., the resource identifier 465 may identify a copy of the resource 420). The mock request 445 may include other response behavior parameters than illustrated, including for example, a time delay parameter, error rate parameter, error level parameter, status code parameter, validation parameter, etc. As described herein, a user may configure the response behavior parameters via a UI at the user device 410 or may configure the parameters in a customized manner. In some cases, the parameters are HTTP headers of a HTTP mock request 445.

A request parsing component 415, which may be an example of the request parsing component 320 of FIG. 3, parses the mock requests 445, identifies behavior parameters 470 as well as other substantive information in the mock request 445, and transmits a parsed request 440 to the behavior handler 430. The behavior handler 430 identifies behaviors based on the parsed request and generates a modified request 450 for the mock implementation 450, which is executed by the mock implementation running component 435. The mock implementation running component 435 may generate mock results 475, which may include an indication of the data fields 425. Based on the fields 425 defined in the resource 420, a data generating component 460 of the server 405 generates data for the mock response 455 that includes generated data 485. Response generating component 480 may format and transmit the mock response 455 including the generated data 485. The generated data 485 includes values based on the data types of the data fields 425. For example, the integer data field num1 includes a value "4321," which is an integer. Similarly, the string data field num3 includes a value "nfTfro," which is a string. It should be understood that the mock response 455 may include other information or data, such as HTTP data.

Using the random data parameter 470-f, a user of the user device 410 may configure a service that interacts with data returned in a mock response 455. For example, a resource 420 may include data corresponding to a customer, and the request 445 may be a request for a set of customers. The service that the user is configuring may receive multiple customer resources in the mock response 455 or a series of mock responses 455 and perform one or more operations on the received customer data. Because the customer data may be randomly generated, the user may configure the service to sort the data based a name (e.g., a string data type), for example.

Figure 5:
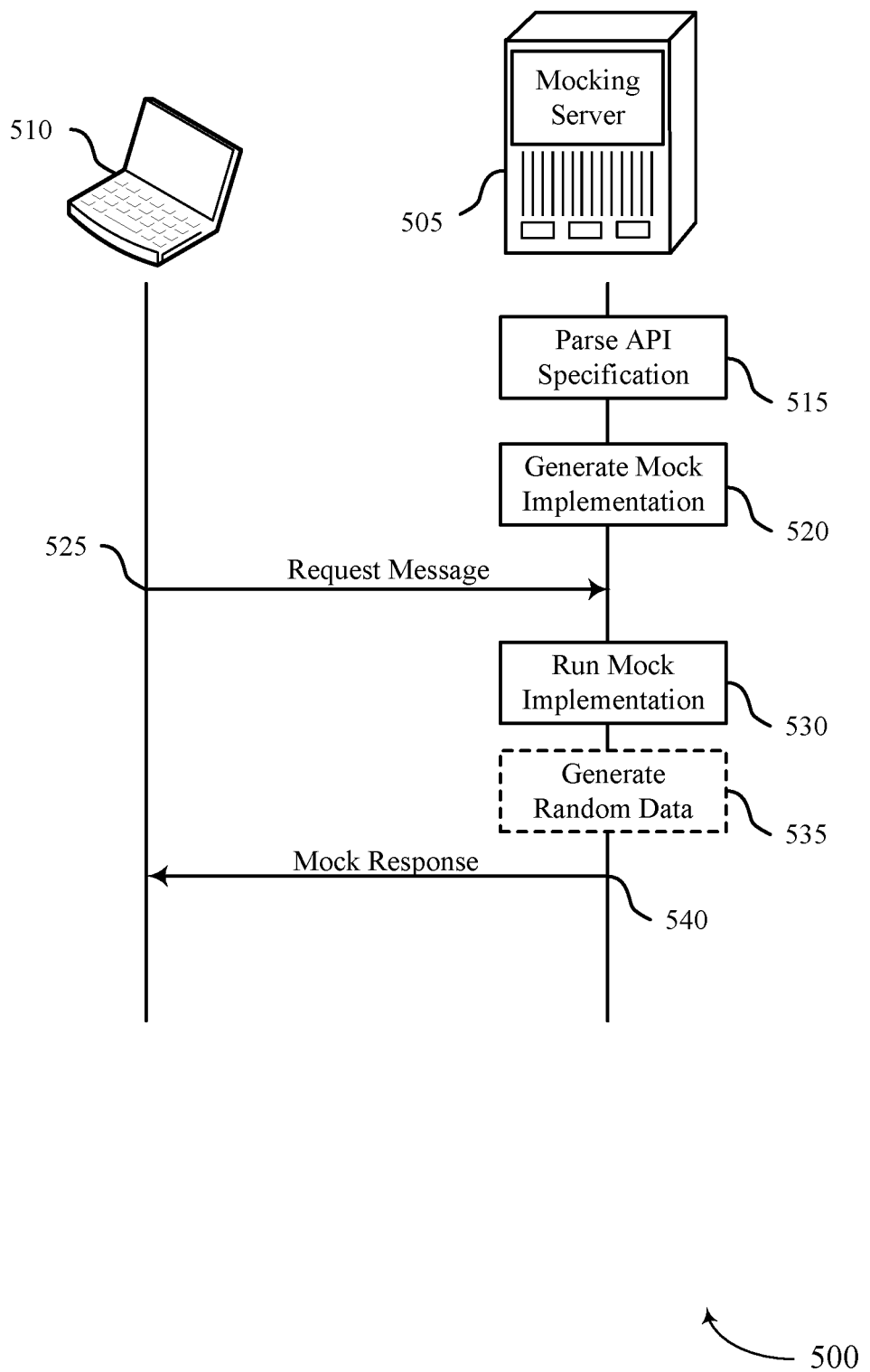
FIG. 5 illustrates an example of a process flow that illustrates user defined mocking service behavior in accordance with aspects of the present disclosure.

FIG. 5 illustrates an example of a process flow 500 that illustrates user defined mocking service behavior in accordance with aspects of the present disclosure. The process flow 500 may include a server 505 and a user device 510. The server 505 may be an example of a mocking server or a server 205, 305, or 405 as described in FIGS. 2 through 4. The user device may be an example of a user device 210, 310, or 410 as described in FIGS. 2 through 4. Alternative examples of the following may be implemented, where some steps are performed in a different order than described or are not performed at all. In some cases, steps may include additional features not mentioned below, or further steps may be added.

At 515, the server 505 may parse, in memory of the server 505, the API specification to determine a parsed model for the API specification. In some cases, the API specification may be written in one of multiple different API specification languages, and the server 405 may be configured to parse any of the multiple API specification languages. The parsed model for the API specification may be an example of a mock model as described herein.

At 520, the server 505 may generate the mock implementation of the API based on the parsed model for the API specification. In some cases, the server 505 may verify the parsed model based on generating the mock implementation of the API, where verifying determines whether the mock implementation is generated successfully. This may provide an opportunity for the server 505 to give feedback on the API specification or the parsed model, where the server 505 is configured to detect possible faults. Generating the mock implementation may include generating machine-readable code and storing the code in memory for execution of the mock implementation according to the received request.

At 525, the user device 510 transmits a request message to the mocking server 505. The request message may include one or more response behavior parameters. The request message may be configured at a UI provided by the mocking service or may be a customized request message. The response behavior parameters may be in the form of custom HTTP headers. Behavior parameters may define response delay time periods, error rates, error levels, status codes, validations, random data generation, etc. In some cases, the server 505 may validate the request message based on a validation parameter being included in the request message. Such validation may include verifying the payload.

At 530, the mocking server 505 runs the mock implementation 530 based on the one or more response behavior parameters. Running the mock implementation may include generating error codes or status, generating resource responses, etc.

At 535, the server 505 may generate random data based on the request message including a random data parameter. The generated random data may be based on data fields defined in the API specification. The data fields may be defined by certain constraints (e.g., rounded to two decimal places) and the random data may be generated according to such constraints.

Figure 6:
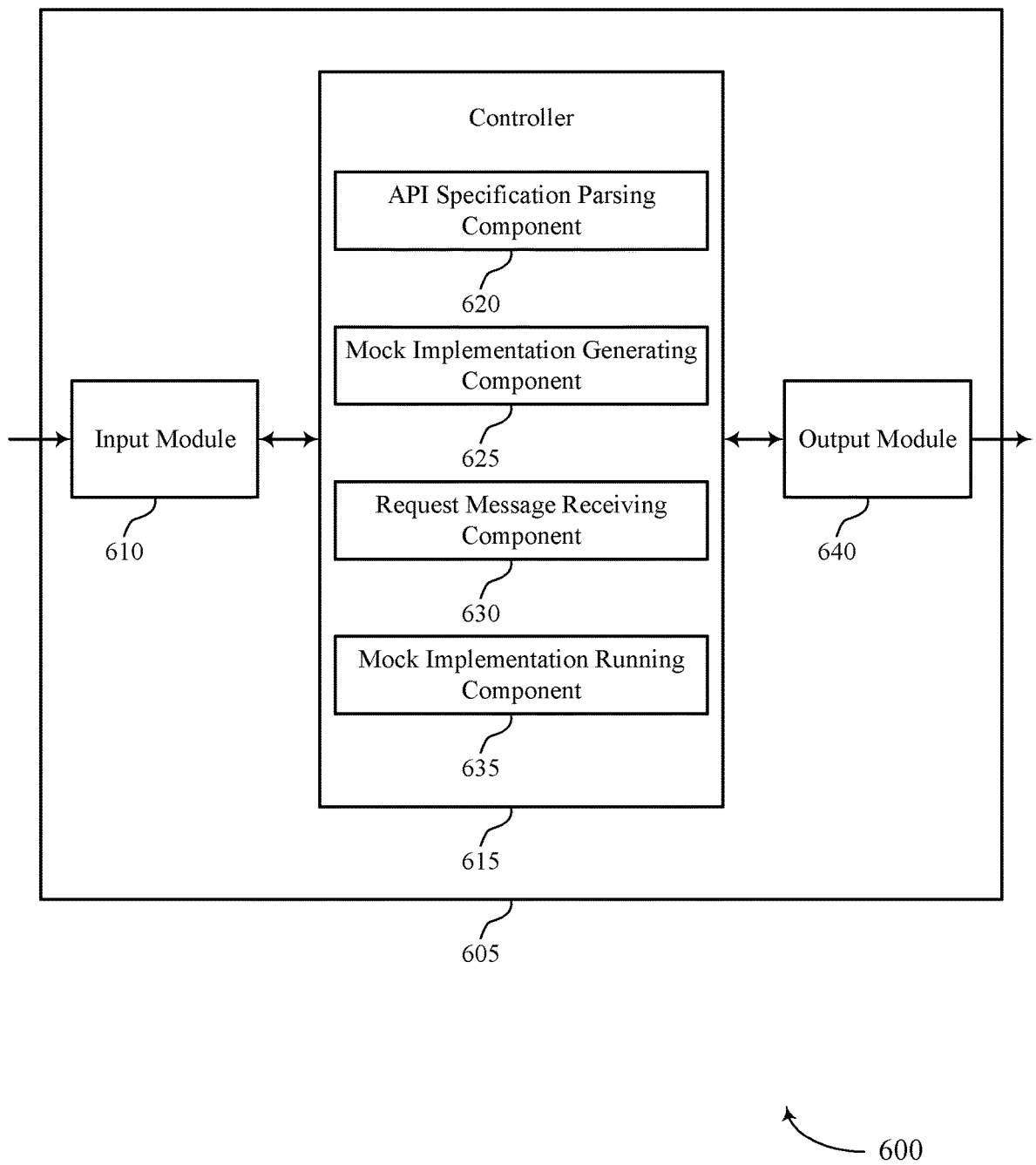
FIG. 6 shows a block diagram of an apparatus that supports user defined mocking service behavior in accordance with aspects of the present disclosure.

FIG. 6 shows a block diagram 600 of an apparatus 605 that supports user defined mocking service behavior in accordance with aspects of the present disclosure. The apparatus 605 may include an input module 610, a controller 615, and an output module 640. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to a controller to support user defined mocking service behavior. In some cases, the input module 610 may be a component of an input/output (I/O) controller 815 as described with reference to FIG. 8.

The controller 615 may include an API specification parsing component 620, a mock implementation generating component 625, a request message receiving component 630, and a mock implementation running component 635. The controller 615 may be an example of aspects of the controller 705 or 810 described with reference to FIGS. 7 and 8.

The controller 615 and/or at least some of its various sub-components may be implemented in hardware, software executed by a processor, firmware, or any combination thereof. If implemented in software executed by a processor, the functions of the controller 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 615 and/or at least some of its various sub-components may be physically located at various positions, including being distributed such that portions of functions are implemented at different physical locations by one or more physical devices. In some examples, the controller 615 and/or at least some of its various sub-components may be a separate and distinct component in accordance with various aspects of the present disclosure. In other examples, the controller 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The API specification parsing component 620 may parse, in memory of the server, an API specification for an API to determine a parsed model for the API specification. The mock implementation generating component 625 may generate a mock implementation of the API based on the parsed model for the API specification. The request message receiving component 630 may receive, from a user device, a request message indicating the mock implementation of the API and one or more response behavior parameters. The mock implementation running component 635 may run, in the memory of the server, the mock implementation of the API and returning a response to the request message to the user device according to the one or more response behavior parameters.

The output module 640 may manage output signals for the apparatus 605. For example, the output module 640 may receive signals from other components of the apparatus 605, such as the controller 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
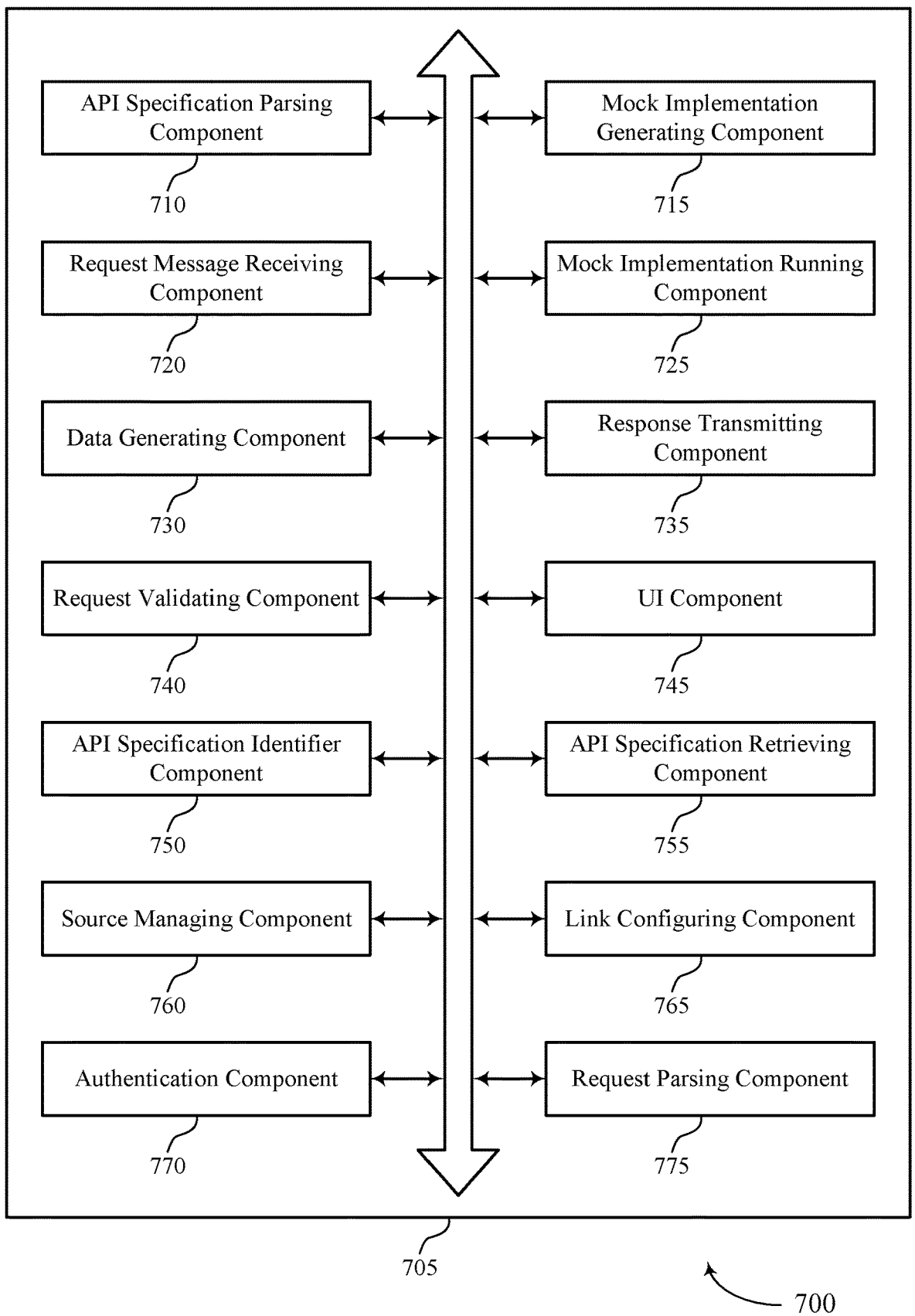
FIG. 7 shows a block diagram of a controller that supports user defined mocking service behavior in accordance with aspects of the present disclosure.

FIG. 7 shows a block diagram 700 of a controller 705 that supports user defined mocking service behavior in accordance with aspects of the present disclosure. The controller 705 may be an example of aspects of a controller 615 or a controller 810 described herein. The controller 705 may include an API specification parsing component 710, a mock implementation generating component 715, a request message receiving component 720, a mock implementation running component 725, a data generating component 730, a response transmitting component 735, a request validating component 740, an UI component 745, an API specification identifier component 750, an API specification retrieving component 755, a source managing component 760, a link configuring component 765, an authentication component 770, and a request parsing component 775. Each of these modules may communicate, directly or indirectly, with one another (e.g., via one or more buses).

The API specification parsing component 710 may parse, in memory of the server, an API specification for an API to determine a parsed model for the API specification. The mock implementation generating component 715 may generate a mock implementation of the API based on the parsed model for the API specification. The request message receiving component 720 may receive, from a user device, a request message indicating the mock implementation of the API and one or more response behavior parameters. In some examples, the request message receiving component 720 may receive, from the user device, the request message indicating the one or more response behavior parameters in a header of the request message.

The mock implementation running component 725 may run, in the memory of the server, the mock implementation of the API and returning a response to the request message to the user device according to the one or more response behavior parameters. The data generating component 730 may generate random data according to one or more data types associated with a requested resource of the API specification, where the request message indicates the requested resource of the API specification and the one or more response behavior parameters indicate a request for dynamically generated data associated with the requested resource. The response transmitting component 735 may return the response to the request message including the generated random data. In some examples, the response transmitting component 735 may return the response to a requested resource according to the API specification and the one or more response behavior parameters, where the request message further indicates the requested resource of the API specification. In some examples, the response transmitting component 735 may return the response to a requested resource of the API specification after a time period indicated by a fixed delay, where the one or more response behavior parameters indicates the fixed delay and the request message indicates the requested resource of the API specification. In some examples, the response transmitting component 735 may return the response including an error code corresponding to an indicated error level, where the error code is specified in the API specification and where the one or more response behavior parameters indicates the error level. The request validating component 740 may validate the request message according to an indicated validation level, where the one or more response behavior parameters indicate the validation level.

The UI component 745 may provide a user interface to the user device, the one or more response behavior parameters being configured via the user interface displayed at the user device. The API specification identifier component 750 may receive, from a second user device, an identifier indicating the API specification for the API. The API specification retrieving component 755 may retrieve the API specification based on the identifier. The source managing component 760 may identify a source for retrieving the API specification based on the identifier.

The link configuring component 765 may generate a link to the mock implementation of the API, the link configured to be shared to the user device. In some examples, the link configuring component 765 may receive the request message indicating the mock implementation based on the generated link.

The authentication component 770 may authenticate the request message based on a permission level associated with the user device prior to running the mock implementation of the API. The request parsing component 775 may parse the request message to identify the one or more response behavior parameters.

Figure 8:
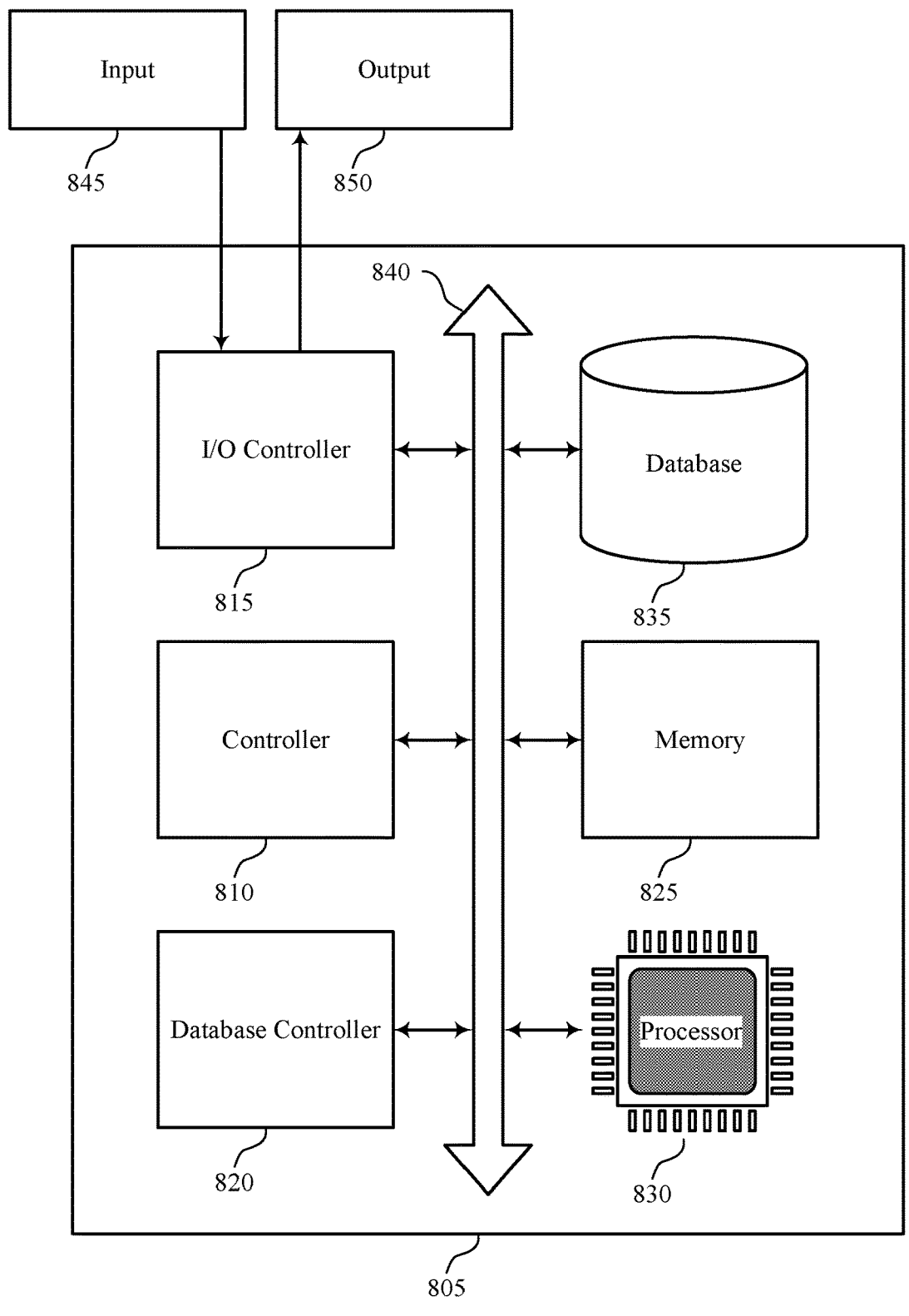
FIG. 8 shows a diagram of a system including a device that supports user defined mocking service behavior in accordance with aspects of the present disclosure.

FIG. 8 shows a diagram of a system 800 including a device 805 that supports user defined mocking service behavior in accordance with aspects of the present disclosure. The device 805 may be an example of or include the components of an application server or an apparatus 605 as described herein. The device 805 may include components for bi-directional data communications including components for transmitting and receiving communications, including a controller 810, an I/O controller 815, a database controller 820, memory 825, a processor 830, and a database 835. These components may be in electronic communication via one or more buses (e.g., bus 840).

The controller 810 may be an example of a controller 615 or 705 as described herein. For example, the controller 810 may perform any of the methods or processes described herein with reference to FIGS. 6 and 7. In some cases, the controller 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting user defined mocking service behavior).

Figure 9:
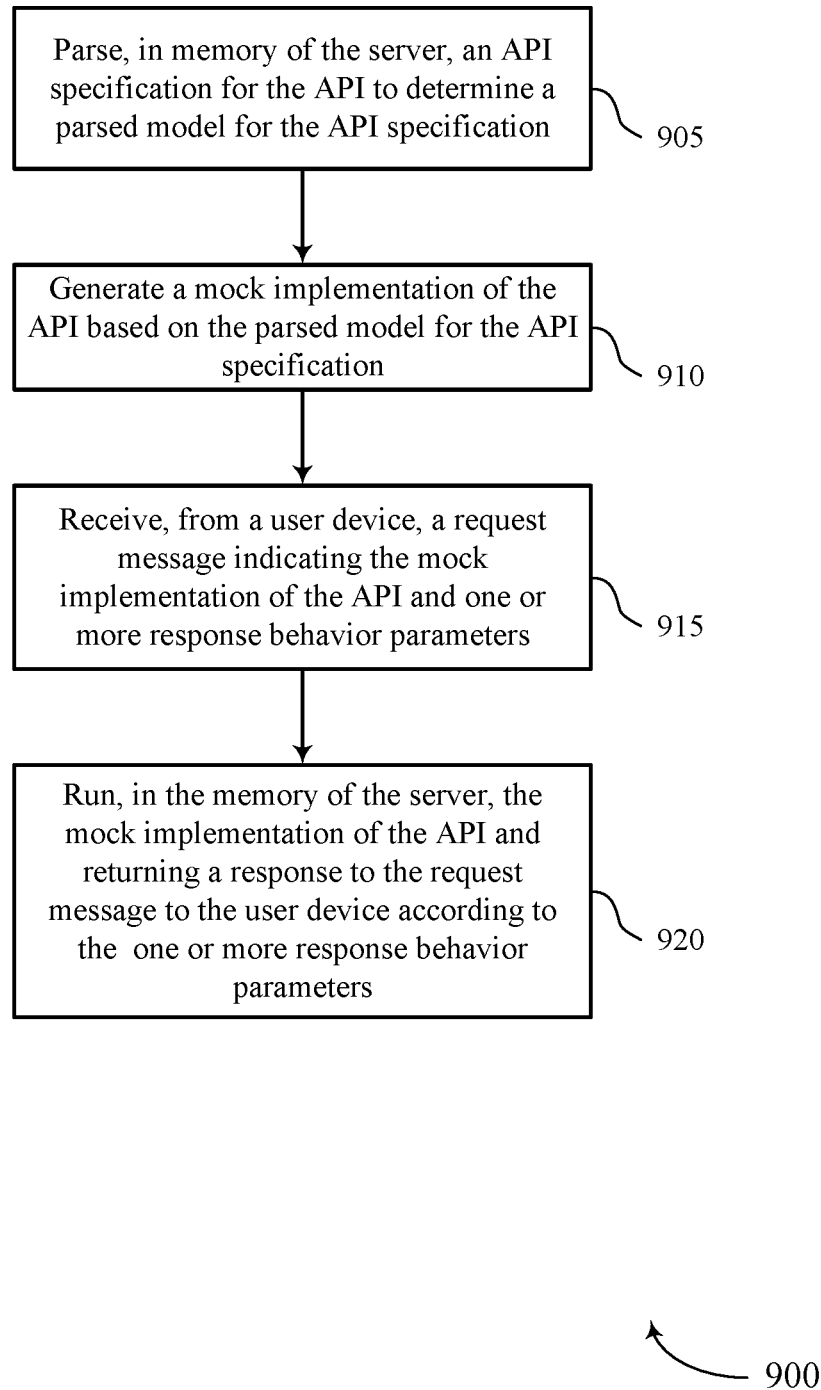
FIGS. 9 through 12 show flowcharts illustrating methods that support user defined mocking service behavior in accordance with aspects of the present disclosure.

FIG. 9 shows a flowchart illustrating a method 900 that supports user defined mocking service behavior in accordance with aspects of the present disclosure. The operations of method 900 may be implemented by an application server or its components as described herein. For example, the operations of method 900 may be performed by a controller as described with reference to FIGS. 6 through 8. In some examples, an application server may execute a set of instructions to control the functional elements of the application server to perform the functions described herein. Additionally or alternatively, an application server may perform aspects of the functions described herein using special-purpose hardware.

At 905, the application server may parse, in memory of the server, an API specification for an API to determine a parsed model for the API specification. The operations of 905 may be performed according to the methods described herein. In some examples, aspects of the operations of 905 may be performed by an API specification parsing component as described with reference to FIGS. 6 through 8.

At 910, the application server may generate a mock implementation of the API based on the parsed model for the API specification. The operations of 910 may be performed according to the methods described herein. In some examples, aspects of the operations of 910 may be performed by a mock implementation generating component as described with reference to FIGS. 6 through 8.

At 915, the application server may receive, from a user device, a request message indicating the mock implementation of the API and one or more response behavior parameters. The operations of 915 may be performed according to the methods described herein. In some examples, aspects of the operations of 915 may be performed by a request message receiving component as described with reference to FIGS. 6 through 8.

At 920, the application server may run, in the memory of the server, the mock implementation of the API and returning a response to the request message to the user device according to the one or more response behavior parameters. The operations of 920 may be performed according to the methods described herein. In some examples, aspects of the operations of 920 may be performed by a mock implementation running component as described with reference to FIGS. 6 through 8.

Figure 10:
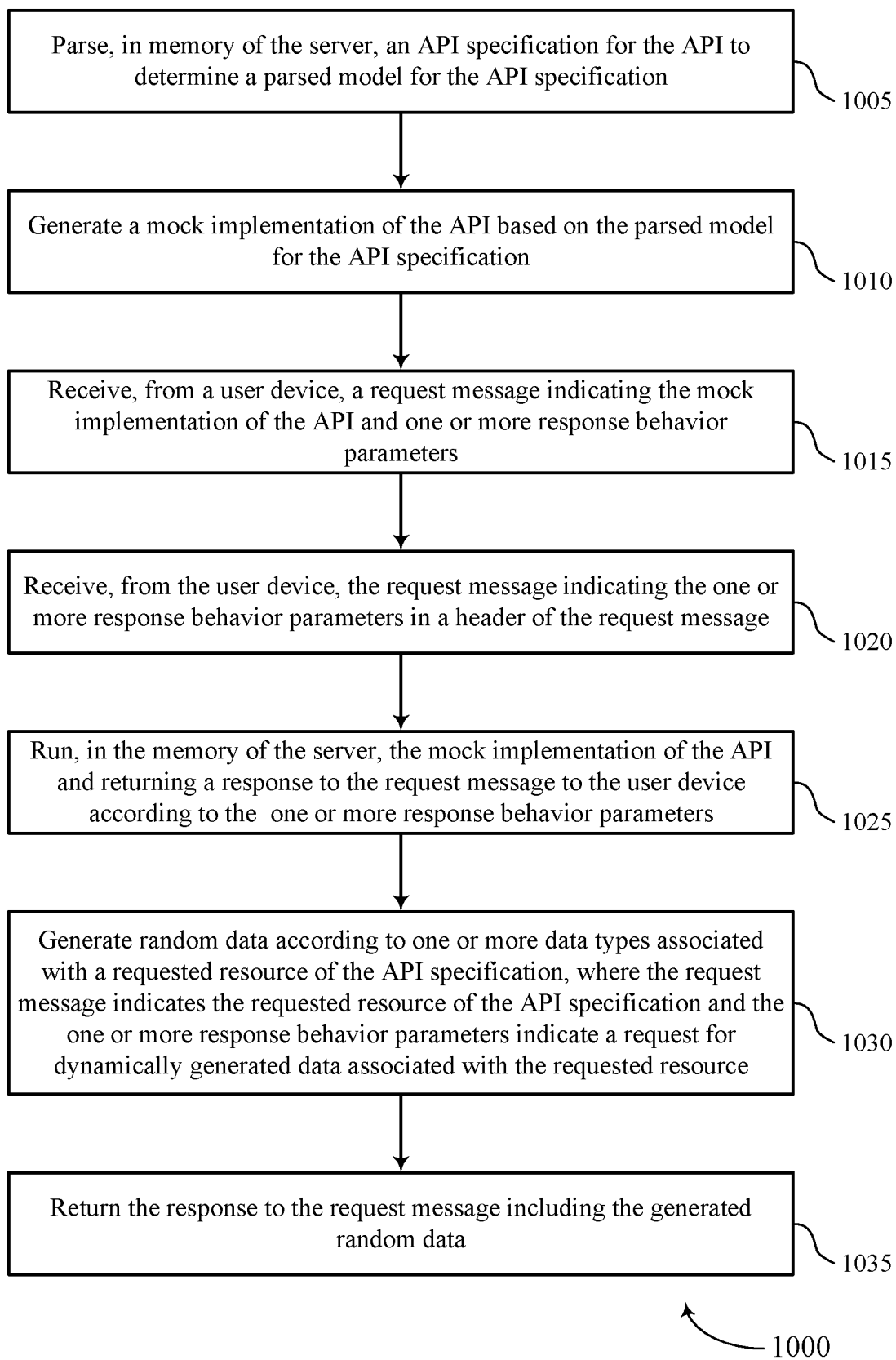

FIG. 10 shows a flowchart illustrating a method 1000 that supports user defined mocking service behavior in accordance with aspects of the present disclosure. The operations of method 1000 may be implemented by an application server or its components as described herein. For example, the operations of method 1000 may be performed by a controller as described with reference to FIGS. 6 through 8. In some examples, an application server may execute a set of instructions to control the functional elements of the application server to perform the functions described herein. Additionally or alternatively, an application server may perform aspects of the functions described herein using special-purpose hardware.

At 1005, the application server may parse, in memory of the server, an API specification for an API to determine a parsed model for the API specification. The operations of 1005 may be performed according to the methods described herein. In some examples, aspects of the operations of 1005 may be performed by an API specification parsing component as described with reference to FIGS. 6 through 8.

At 1010, the application server may generate a mock implementation of the API based on the parsed model for the API specification. The operations of 1010 may be performed according to the methods described herein. In some examples, aspects of the operations of 1010 may be performed by a mock implementation generating component as described with reference to FIGS. 6 through 8.

At 1015, the application server may receive, from a user device, a request message indicating the mock implementation of the API and one or more response behavior parameters. The operations of 1015 may be performed according to the methods described herein. In some examples, aspects of the operations of 1015 may be performed by a request message receiving component as described with reference to FIGS. 6 through 8.

At 1020, the application server may receive, from the user device, the request message indicating the one or more response behavior parameters in a header of the request message. The operations of 1020 may be performed according to the methods described herein. In some examples, aspects of the operations of 1020 may be performed by a request message receiving component as described with reference to FIGS. 6 through 8.

At 1025, the application server may run, in the memory of the server, the mock implementation of the API and returning a response to the request message to the user device according to the one or more response behavior parameters. The operations of 1025 may be performed according to the methods described herein. In some examples, aspects of the operations of 1025 may be performed by a mock implementation running component as described with reference to FIGS. 6 through 8.

At 1030, the application server may generate random data according to one or more data types associated with a requested resource of the API specification, where the request message indicates the requested resource of the API specification and the one or more response behavior parameters indicate a request for dynamically generated data associated with the requested resource. The operations of 1030 may be performed according to the methods described herein. In some examples, aspects of the operations of 1030 may be performed by a data generating component as described with reference to FIGS. 6 through 8.

At 1035, the application server may return the response to the request message including the generated random data. The operations of 1035 may be performed according to the methods described herein. In some examples, aspects of the operations of 1035 may be performed by a response transmitting component as described with reference to FIGS. 6 through 8.

Figure 11:
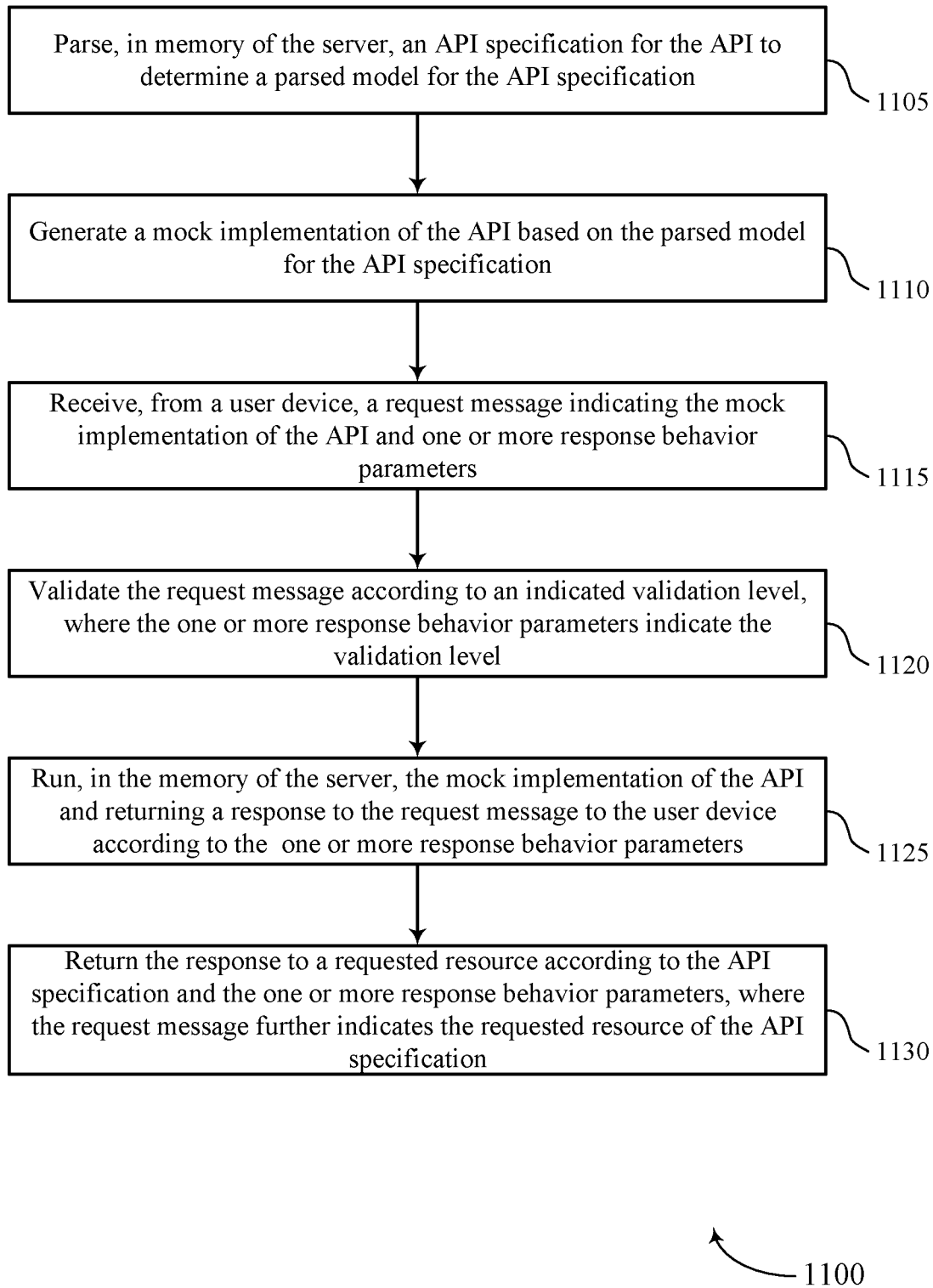

FIG. 11 shows a flowchart illustrating a method 1100 that supports user defined mocking service behavior in accordance with aspects of the present disclosure. The operations of method 1100 may be implemented by an application server or its components as described herein. For example, the operations of method 1100 may be performed by a controller as described with reference to FIGS. 6 through 8. In some examples, an application server may execute a set of instructions to control the functional elements of the application server to perform the functions described herein. Additionally or alternatively, an application server may perform aspects of the functions described herein using special-purpose hardware.

At 1105, the application server may parse, in memory of the server, an API specification for an API to determine a parsed model for the API specification. The operations of 1105 may be performed according to the methods described herein. In some examples, aspects of the operations of 1105 may be performed by an API specification parsing component as described with reference to FIGS. 6 through 8.

At 1110, the application server may generate a mock implementation of the API based on the parsed model for the API specification. The operations of 1110 may be performed according to the methods described herein. In some examples, aspects of the operations of 1110 may be performed by a mock implementation generating component as described with reference to FIGS. 6 through 8.

At 1115, the application server may receive, from a user device, a request message indicating the mock implementation of the API and one or more response behavior parameters. The operations of 1115 may be performed according to the methods described herein. In some examples, aspects of the operations of 1115 may be performed by a request message receiving component as described with reference to FIGS. 6 through 8.

At 1120, the application server may validate the request message according to an indicated validation level, where the one or more response behavior parameters indicate the validation level. The operations of 1120 may be performed according to the methods described herein. In some examples, aspects of the operations of 1120 may be performed by a request validating component as described with reference to FIGS. 6 through 8.

At 1125, the application server may run, in the memory of the server, the mock implementation of the API and returning a response to the request message to the user device according to the one or more response behavior parameters. The operations of 1125 may be performed according to the methods described herein. In some examples, aspects of the operations of 1125 may be performed by a mock implementation running component as described with reference to FIGS. 6 through 8.

At 1130, the application server may return the response to a requested resource according to the API specification and the one or more response behavior parameters, where the request message further indicates the requested resource of the API specification. The operations of 1130 may be performed according to the methods described herein. In some examples, aspects of the operations of 1130 may be performed by a response transmitting component as described with reference to FIGS. 6 through 8.

Figure 12:
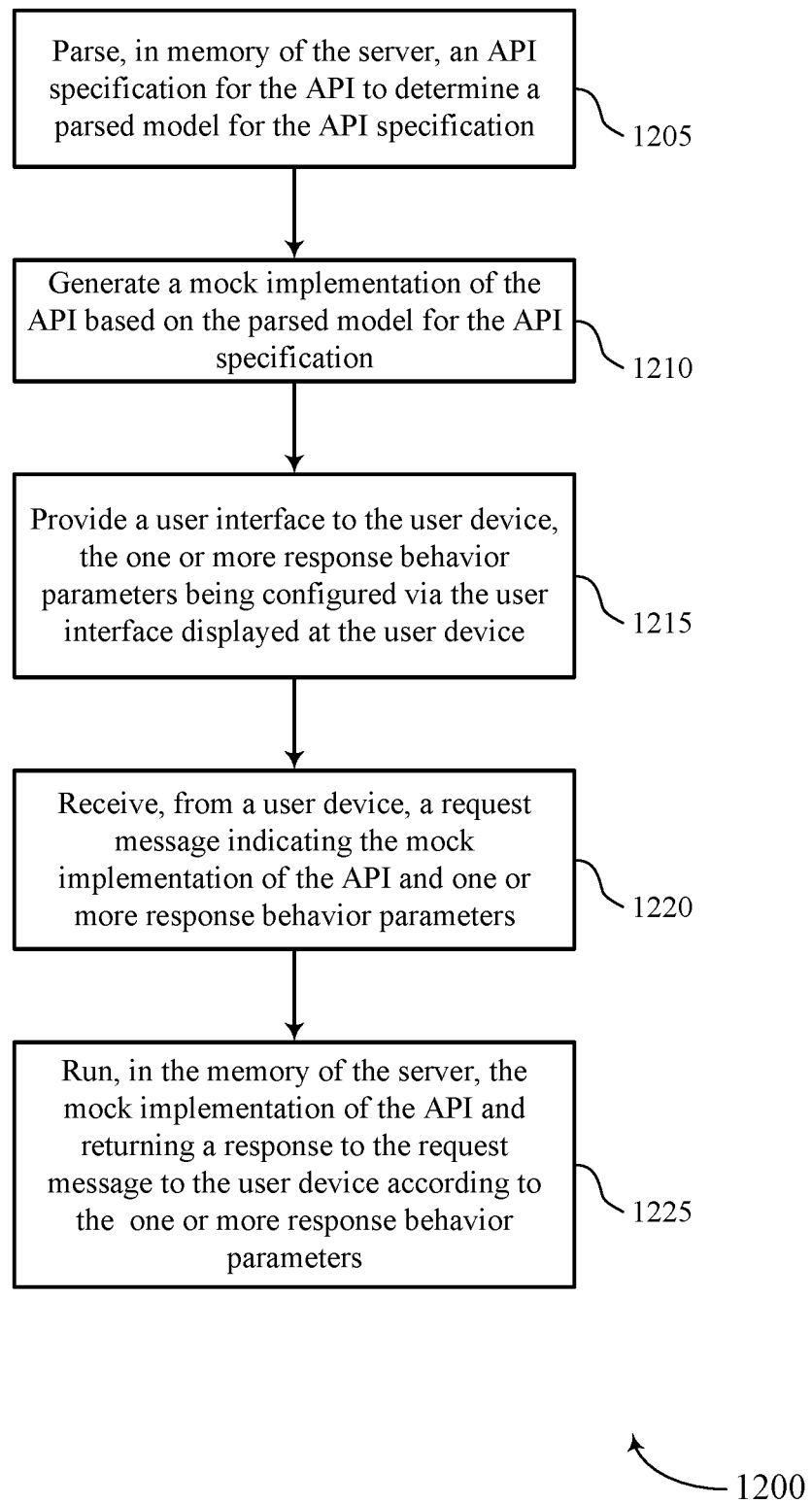

FIG. 12 shows a flowchart illustrating a method 1200 that supports user defined mocking service behavior in accordance with aspects of the present disclosure. The operations of method 1200 may be implemented by an application server or its components as described herein. For example, the operations of method 1200 may be performed by a controller as described with reference to FIGS. 6 through 8. In some examples, an application server may execute a set of instructions to control the functional elements of the application server to perform the functions described herein. Additionally or alternatively, an application server may perform aspects of the functions described herein using special-purpose hardware.

At 1205, the application server may parse, in memory of the server, an API specification for an API to determine a parsed model for the API specification. The operations of 1205 may be performed according to the methods described herein. In some examples, aspects of the operations of 1205 may be performed by an API specification parsing component as described with reference to FIGS. 6 through 8.

At 1210, the application server may generate a mock implementation of the API based on the parsed model for the API specification. The operations of 1210 may be performed according to the methods described herein. In some examples, aspects of the operations of 1210 may be performed by a mock implementation generating component as described with reference to FIGS. 6 through 8.

At 1215, the application server may provide a user interface to the user device, the one or more response behavior parameters being configured via the user interface displayed at the user device. The operations of 1215 may be performed according to the methods described herein. In some examples, aspects of the operations of 1215 may be performed by an UI component as described with reference to FIGS. 6 through 8.

At 1220, the application server may receive, from a user device, a request message indicating the mock implementation of the API and one or more response behavior parameters. The operations of 1220 may be performed according to the methods described herein. In some examples, aspects of the operations of 1220 may be performed by a request message receiving component as described with reference to FIGS. 6 through 8.

At 1225, the application server may run, in the memory of the server, the mock implementation of the API and returning a response to the request message to the user device according to the one or more response behavior parameters. The operations of 1225 may be performed according to the methods described herein. In some examples, aspects of the operations of 1225 may be performed by a mock implementation running component as described with reference to FIGS. 6 through 8.

A method of testing an application programming interface (API) at a server is described. The method may include parsing, in memory of the server, an API specification for the API to determine a parsed model for the API specification, generating a mock implementation of the API based on the parsed model for the API specification, receiving, from a user device, a request message indicating the mock implementation of the API and one or more response behavior parameters, and running, in the memory of the server, the mock implementation of the API and returning a response to the request message to the user device according to the one or more response behavior parameters.

An apparatus for testing an application programming interface (API) at a server is described. The apparatus may include a processor, memory in electronic communication with the processor, and instructions stored in the memory. The instructions may be executable by the processor to cause the apparatus to parse, in memory of the server, an API specification for the API to determine a parsed model for the API specification, generate a mock implementation of the API based on the parsed model for the API specification, receive, from a user device, a request message indicating the mock implementation of the API and one or more response behavior parameters, and run, in the memory of the server, the mock implementation of the API and returning a response to the request message to the user device according to the one or more response behavior parameters.

Another apparatus for testing an application programming interface (API) at a server is described. The apparatus may include means for parsing, in memory of the server, an API specification for the API to determine a parsed model for the API specification, generating a mock implementation of the API based on the parsed model for the API specification, receiving, from a user device, a request message indicating the mock implementation of the API and one or more response behavior parameters, and running, in the memory of the server, the mock implementation of the API and returning a response to the request message to the user device according to the one or more response behavior parameters.

A non-transitory computer-readable medium storing code for testing an application programming interface (API) at a server is described. The code may include instructions executable by a processor to parse, in memory of the server, an API specification for the API to determine a parsed model for the API specification, generate a mock implementation of the API based on the parsed model for the API specification, receive, from a user device, a request message indicating the mock implementation of the API and one or more response behavior parameters, and run, in the memory of the server, the mock implementation of the API and returning a response to the request message to the user device according to the one or more response behavior parameters.

Some examples of the method, apparatuses, and non-transitory computer-readable medium described herein may further include operations, features, means, or instructions for receiving, from the user device, the request message indicating the one or more response behavior parameters in a header of the request message.

In some examples of the method, apparatuses, and non-transitory computer-readable medium described herein, the header may be a hypertext transfer protocol (HTTP) header, and where the indication of the mock implementation of the API includes a link corresponding to the mock implementation of the API.

Some examples of the method, apparatuses, and non-transitory computer-readable medium described herein may further include operations, features, means, or instructions for generating random data according to one or more data types associated with a requested resource of the API specification, where the request message indicates the requested resource of the API specification and the one or more response behavior parameters indicate a request for dynamically generated data associated with the requested resource, and returning the response to the request message including the generated random data.

Some examples of the method, apparatuses, and non-transitory computer-readable medium described herein may further include operations, features, means, or instructions for returning the response to a requested resource according to the API specification and the one or more response behavior parameters, where the request message further indicates the requested resource of the API specification.

Some examples of the method, apparatuses, and non-transitory computer-readable medium described herein may further include operations, features, means, or instructions for returning the response to a requested resource of the API specification after a time period indicated by a fixed delay, where the one or more response behavior parameters indicates the fixed delay and the request message indicates the requested resource of the API specification.

Some examples of the method, apparatuses, and non-transitory computer-readable medium described herein may further include operations, features, means, or instructions for returning the response including an error code corresponding to an indicated error level, where the error code may be specified in the API specification and where the one or more response behavior parameters indicates the error level.

Some examples of the method, apparatuses, and non-transitory computer-readable medium described herein may further include operations, features, means, or instructions for validating the request message according to an indicated validation level, where the one or more response behavior parameters indicate the validation level.

In some examples of the method, apparatuses, and non-transitory computer-readable medium described herein, the one or more response behavior parameters indicate a fixed delay simulation, a variable delay simulation, an error rate, an error level, or a combination thereof.

Some examples of the method, apparatuses, and non-transitory computer-readable medium described herein may further include operations, features, means, or instructions for providing a user interface to the user device, the one or more response behavior parameters being configured via the user interface displayed at the user device.

In some examples of the method, apparatuses, and non-transitory computer-readable medium described herein, the mock implementation of the API may be run in the memory of the server and generated without accessing a database.

In some examples of the method, apparatuses, and non-transitory computer-readable medium described herein, the mock implementation for the API may be generated based on metadata of the API specification.

Some examples of the method, apparatuses, and non-transitory computer-readable medium described herein may further include operations, features, means, or instructions for receiving, from a second user device, an identifier indicating the API specification for the API, and retrieving the API specification based on the identifier.

Some examples of the method, apparatuses, and non-transitory computer-readable medium described herein may further include operations, features, means, or instructions for identifying a source for retrieving the API specification based on the identifier.

Some examples of the method, apparatuses, and non-transitory computer-readable medium described herein may further include operations, features, means, or instructions for the source for retrieving the API specification being an internal repository of the server, an external repository, a shared code repository, a file upload, a memory storage at the server, or a cloud storage.

Some examples of the method, apparatuses, and non-transitory computer-readable medium described herein may further include operations, features, means, or instructions for generating a link to the mock implementation of the API, the link configured to be shared to the user device, and receiving the request message indicating the mock implementation based on the generated link.

Some examples of the method, apparatuses, and non-transitory computer-readable medium described herein may further include operations, features, means, or instructions for authenticating the request message based on a permission level associated with the user device prior to running the mock implementation of the API.

Some examples of the method, apparatuses, and non-transitory computer-readable medium described herein may further include operations, features, means, or instructions for parsing the request message to identify the one or more response behavior parameters.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for testing an application programming interface (API) at a server, comprising:
   parsing, in memory of the server, an API specification for the API to determine a parsed model for the API specification;
   generating a mock implementation of the API based at least in part on the parsed model for the API specification;
   receiving, from a user device, a request message indicating the mock implementation of the API and one or more response behavior parameters comprising at least a first response behavior parameter requesting dynamically generated data for a data field supported by the API specification;
   generating random data according to a data type of the data field based at least in part on the first response behavior parameter;
   running, in the memory of the server, the mock implementation of the API using the generated random data to determine a response to the request message according to the one or more response behavior parameters; and
   sending, to the user device, the response to the request message.

2. The method of claim 1, wherein receiving, from the user device, the request message comprises:
   receiving, from the user device, the request message indicating the one or more response behavior parameters in a header of the request message.

3. The method of claim 2, wherein the header is a hypertext transfer protocol (HTTP) header, and wherein the request message indicates the mock implementation of the API using a link corresponding to the mock implementation of the API.

4. The method of claim 1, further comprising:
   sending at least a portion of the response to the request message to a requested resource according to the API specification and the one or more response behavior parameters, wherein the request message further indicates the requested resource of the API specification.

5. The method of claim 1, further comprising:
   sending at least a portion of the response to the request message to a requested resource of the API specification after a time period indicated by a fixed delay, wherein the one or more response behavior parameters indicates the fixed delay and the request message indicates the requested resource of the API specification.

6. The method of claim 1, wherein sending, to the user device, the response to the request message comprises:
   sending the response to the request message including an error code corresponding to an indicated error level, wherein the error code is specified in the API specification and wherein the one or more response behavior parameters indicates the error level.

7. The method of claim 1, further comprising:
validating the request message according to an indicated validation level, wherein the one or more response behavior parameters indicate the validation level.

8. The method of claim 1, wherein the one or more response behavior parameters indicate a fixed delay simulation, a variable delay simulation, an error rate, an error level, or a combination thereof.

9. The method of claim 1, further comprising:
providing a user interface to the user device, the one or more response behavior parameters being configured via the user interface displayed at the user device.

10. An apparatus for testing an application programming interface (API) at a server, comprising:
a processor,
memory in electronic communication with the processor; and
instructions stored in the memory and executable by the processor to cause the apparatus to:
parse, in memory of the server, an API specification for the API to determine a parsed model for the API specification;
generate a mock implementation of the API based at least in part on the parsed model for the API specification;
receive, from a user device, a request message indicating the mock implementation of the API and one or more response behavior parameters comprising at least a first response behavior parameter requesting dynamically generated data for a data field supported by the API specification;
generate random data according to a data type of the data field based at least in part on the first response behavior parameter;
run, in the memory of the server, the mock implementation of the API using the generated random data to determine a response to the request message according to the one or more response behavior parameters; and
send, to the user device, the response to the request message.

11. The apparatus of claim 10, wherein the instructions executable by the processor to cause the apparatus to receive, from the user device, the request message are executable by the processor to cause the apparatus to:
receive, from the user device, the request message indicating the one or more response behavior parameters in a header of the request message.

12. The apparatus of claim 11, wherein the header is a hypertext transfer protocol (HTTP) header, and wherein the request message indicates the mock implementation of the API using a link corresponding to the mock implementation of the API.

13. The apparatus of claim 10, wherein the instructions are further executable by the processor to cause the apparatus to:
send at least a portion of the response to the request message to a requested resource according to the API specification and the one or more response behavior parameters, wherein the request message further indicates the requested resource of the API specification.

14. The apparatus of claim 10, wherein the one or more response behavior parameters indicate a fixed delay simulation, a variable delay simulation, an error rate, an error level, or a combination thereof.

15. A non-transitory computer-readable medium storing code for testing an application programming interface (API) at a server, the code comprising instructions executable by a processor to:
parse, in memory of the server, an API specification for the API to determine a parsed model for the API specification;
generate a mock implementation of the API based at least in part on the parsed model for the API specification;
receive, from a user device, a request message indicating the mock implementation of the API and one or more response behavior parameters comprising at least a first response behavior parameter requesting dynamically generated data for a data field supported by the API specification;
generate random data according to a data type of the data field based at least in part on the first response behavior parameter;
run, in the memory of the server, the mock implementation of the API using the generated random data to determine a response to the request message according to the one or more response behavior parameters; and
send, to the user device, the response to the request message.

16. The non-transitory computer-readable medium of claim 15, wherein the instructions executable by the processor to receive, from the user device, the request message are executable to:
receive, from the user device, the request message indicating the one or more response behavior parameters in a header of the request message.

17. The non-transitory computer-readable medium of claim 15, wherein the one or more response behavior parameters indicate a fixed delay simulation, a variable delay simulation, an error rate, an error level, or a combination thereof.

* * * * *